Sept. 1, 1925.
W. G. BRUNS
PLANT SPRAYING MACHINE
Filed Aug. 31, 1923   2 Sheets-Sheet 1
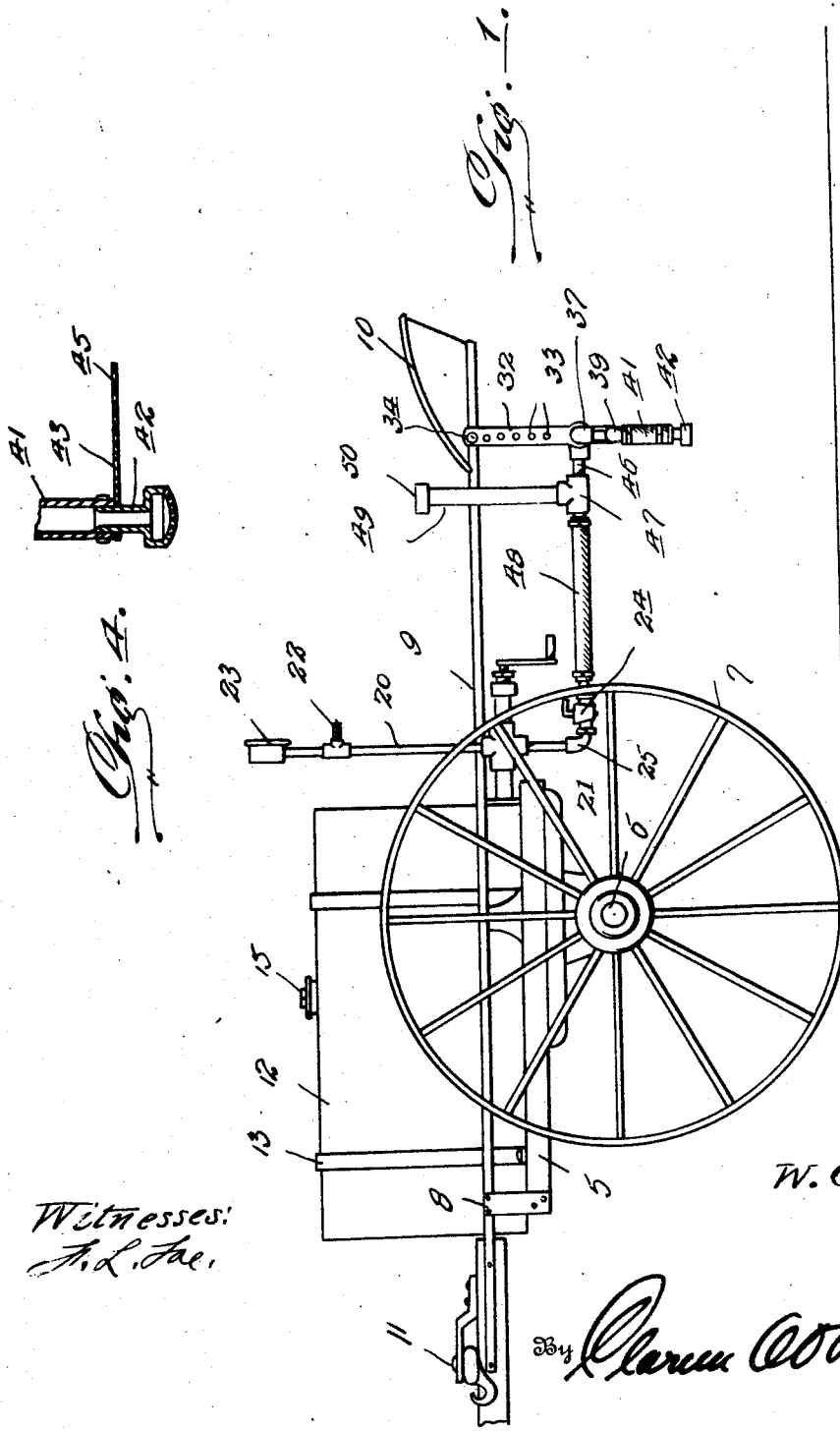

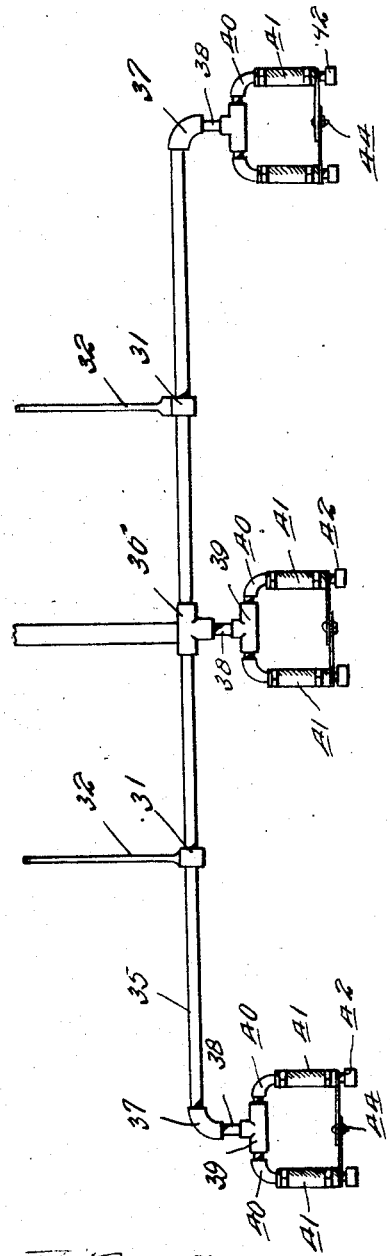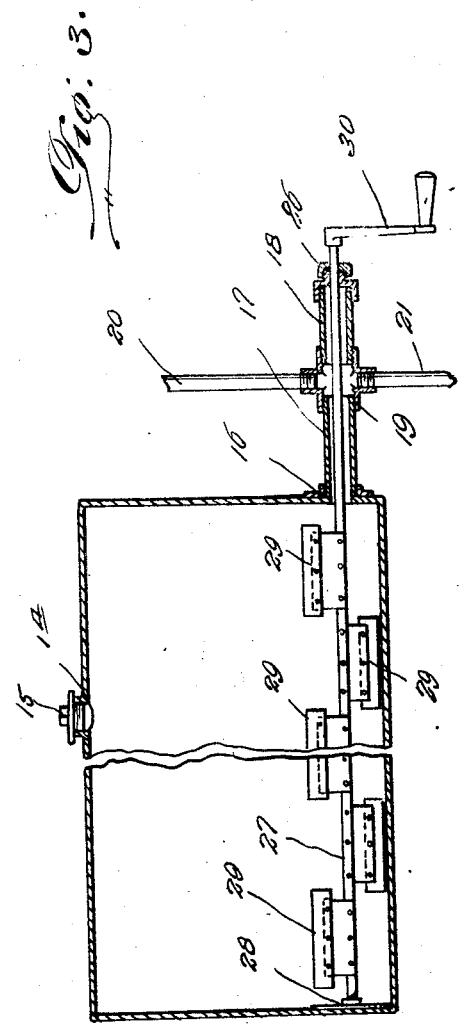

Patented Sept. 1, 1925.

1,551,796

UNITED STATES PATENT OFFICE.

WILLIAM G. BRUNS, OF WILMONT, MINNESOTA.

PLANT-SPRAYING MACHINE.

Application filed August 31, 1923. Serial No. 660,307.

*To all whom it may concern:*

Be it known that I, WILLIAM G. BRUNS, a citizen of the United States of America, residing at Wilmont, in the county of Nobles and State of Minnesota, have invented certain new and useful Improvements in Plant-Spraying Machines, of which the following is a specification.

In carrying out the present invention it is my purpose to provide a highly novel and simplified form of machine whereby potato plants may be sprayed with a mixture of Paris green or arsenate of lead together with a desirable amount of water for exterminating the insects that gather upon said plants and greatly damage the same.

The primary object of my invention is to provide such a machine wherein the component parts thereof may be mounted in a novel and simple manner upon an unused cultivator or other desirable type of wheeled support the device comprising relatively few parts and these co-related in such a manner as to reduce the possibility of disarrangement to a minimum.

A still further object of my invention resides in the provision of such a plant spraying machine wherein the same includes a fluid tank which is to be charged with compressed air for discharging the contents thereof whenever the control valve is opened.

Another object is the provision of such a machine wherein the same embodies a plurality of spraying nozzles arranged in pairs for permitting a multiplicity of rows of plants to be sprayed with the material simultaneously, means being also provided for adjusting these nozzles laterally of the machine for bringing the nozzles into positions directly above the plants to be sprayed.

An additional object is to include in the fluid tank a novel form of scraping means under the control of the operator of the machine whereby the Paris green or arsenate of lead that settles to the bottom may be sprayed therefrom.

Other objects of this invention will become apparent as the nature of the same is better understood the invention comprising the novel form, combination and arrangement of parts set forth in the following specification, shown in the accompanying drawings and claimed.

In the drawings wherein like reference characters indicate corresponding parts throughout the several views, Figure 1 is a side elevational view of my improved machine, Figure 2 is an elevational view of the sprinkler elements removed from the machine, Figure 3 is an enlarged detail cross section through the fluid tank, and Figure 4 is an enlarged fragmentary section through one of the spraying nozzles per se.

Now having particular reference to the drawings, 5 designates the platform supported upon a cross axle 6 upon the opposite ends of which are supporting wheels 7. Extending longitudinally and supported above said platform by brackets 8 is a rearwardly directed platform 9 upon the rear end of which is an operator's seat 10, the front end of this platform 9 carrying a desirable form of draft appliance 11. The construction just set forth forms parts of well known cultivators and it is desirable that my improved sprinkling apparatus be associated with such a supporting means.

My sprinkling device per se embodies the provision of a tank 12 positioned upon said platform 5 and secured thereto through the medium of a desirable number of straps 13 this tank being formed with a filling opening 14 within which is positioned a closure plug 15, Figure 3.

Adjacent the lower side of the tank 12 and in the rear wall thereof is an opening 16 in alinement with which is a rearwardly directed pipe 17 this pipe being secured to the tank in communication with said opening through the medium of any desirable form of coupling. The said pipe 17 is in continuous relationship with another pipe 18 secured to each other through the medium of a multi-way coupling 19 there being also associated with this coupling 19 a vertically extending pipe 20 and a downwardly extending pipe 21. The pipe 20 is equipped adjacent its upper end with a compressed air inlet valve 22 as well as a pressure gauge 23 the other pipe 21 being associated with a control valve 24 through the medium of an elbow coupling 25.

The free end of the before mentioned pipe 18 is equipped with a cap 26 that is provided with a central opening through which extends the rearmost end of a horizontal shaft 27 this shaft extending through said pipes 17 and 18 and being journaled at its front end within a bearing 28 within said tank 12 and upon the front wall thereof. The portion of this shaft 27 within the tank 15 is equipped with a desirable number of agitating plates 29 which are preferably arranged in staggered relation to each other as clearly shown in Figure 3. The rearmost end of said shaft 27 is equipped with a crank handle 30 in convenient reach of the operator upon the seat 10 for enabling the shaft to be rotated and the scrapers 29 consequently actuated to scrape the material that would settle to the bottom of the tank therefrom.

Freely slidable in collars 31 formed upon the lower ends of metal hangers 32 that are provided with a plurality of openings 33 whereby the same may be adjustably secured to the before mentioned platform 9 at opposite sides of the seat 10 and adjacent the front end thereof through the medium of bolts or other suitable connections 34 is a transversely disposed relatively elongated pipe 35. This pipe 35 as more clearly shown in Figure 2 is equipped centrally with a T-coupling 36 and at its opposite ends with elbow couplings 37. Pendant from each of these couplings is a short pipe section 38 that is in turn equipped at its lower end with a T-coupling 39 secured to the opposite ends of which are elbow couplings 40 to which are in turn secured pendant flexible pipes 41. Within the lower ends of these flexible pipes 41 as shown in Figure 4, are sprinkler heads 42 which are adjustably connected to each other through the medium of a pair of links 43 adjustably secured together through the medium of a bolt and nut connection 44 it being obvious that each of said links is provided with a plurality of openings 45 for purposes of adjustment.

Having communication with the before mentioned transversely arranged pipe 35 is a forwardly extending short pipe section 46 that carries at its opposite end a T-coupling 47 which is in communication with the before mentioned control valve 24 through the medium of a flexible connection 48. Extending upwardly from said T-coupling 47 is a pipe 49 that is equipped at its upper end with a closure cap 50 it being noted in this connection that this pipe 49 affords a hand lever whereby said pipe 35 may be shifted laterally in opposite directions within the collars 31 formed upon the lower ends of said hangers 32 whereby the pairs of fluid discharge nozzles may be adjusted when desirable this pipe 49 also serving as an air trap.

The specific operation together with numerous advantages of a spraying machine of this character will be at once apparent to those skilled in the art, it being obvious that I have provided a machine that will meet with all of the requirements for a successful commercial use.

Minor changes may be made within the invention without departing from the spirit and scope of the appended claim.

Having thus described my invention, what I claim as new and desire to secure by Letters Patent is:

In a plant spraying machine, a nozzle structure comprising a pipe, a T-shaped fitting connected with the pipe, elbow fittings connected with the ends of the T-shaped fitting, flexible pipe sections connected with the elbow fittings and disposed approximately parallel with each other, sprinkler heads connected with the flexible pipe sections, links connected at their outer ends with the sprinkler heads and having inner end portions which overlap each other horizontally and a pivot bolt for adjustably securing the overlapping portions of the links together, said pivot bolt being parallel with the sprinkler heads.

In testimony whereof I affix my signature.

WILLIAM G. BRUNS.